(12) United States Patent
Tanaka et al.

(10) Patent No.: US 12,305,690 B2
(45) Date of Patent: May 20, 2025

(54) AIRCRAFT COMPONENT COUPLING ASSEMBLY AND COUPLER FOR AIRCRAFT COMPONENTS

(71) Applicant: Kawasaki Jukogyo Kabushiki Kaisha, Kobe (JP)

(72) Inventors: Kentaro Tanaka, Kobe (JP); Kunio Nawata, Kobe (JP); Sachinori Ishimoto, Kobe (JP); Kota Nakaya, Kobe (JP); Tatsuro Akasaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 763 days.

(21) Appl. No.: 17/531,808

(22) Filed: Nov. 22, 2021

(65) Prior Publication Data
US 2022/0074446 A1 Mar. 10, 2022

Related U.S. Application Data

(63) Continuation of application No. PCT/JP2020/019951, filed on May 20, 2020.

(30) Foreign Application Priority Data

May 23, 2019 (JP) ................. 2019-096716

(51) Int. Cl.
*F16B 43/00* (2006.01)
*B64C 1/06* (2006.01)
*F16B 5/02* (2006.01)

(52) U.S. Cl.
CPC .............. *F16B 43/00* (2013.01); *B64C 1/069* (2013.01); *F16B 5/02* (2013.01)

(58) Field of Classification Search
CPC .......... F16B 43/00; F16B 5/02; F16B 5/0225; F16B 5/025; F16B 35/044; F16B 35/045; B64F 5/10; B64C 1/068; B64C 1/069
See application file for complete search history.

(56) References Cited

U.S. PATENT DOCUMENTS 1,346,325 A * 7/1920 McKinley ............. F16B 5/0225
180/69.2
2,846,250 A 8/1958 Davis
(Continued)

FOREIGN PATENT DOCUMENTS

FR 3089202 A1 6/2020
GB 2190456 A * 11/1987 ............. A01B 15/14
(Continued)

OTHER PUBLICATIONS

Office Action mailed Nov. 21, 2023, in European Application No. 20808927.6, 6 pages.

*Primary Examiner* — Matthew R McMahon
(74) *Attorney, Agent, or Firm* — XSENSUS LLP

(57) ABSTRACT

An aircraft component coupling assembly includes first and second plate structures placed and a coupler coupling the first and second plate structures. The first plate structure includes a first insertion hole and a first serration located on a first outer surface of the first plate structure and surrounding the first insertion hole. The second plate structure includes a second insertion hole differing in inner diameter from the first insertion hole. The coupler includes: a contact structure including a second serration and a third insertion hole; a shaft structure being fixedly engaged with one of a second outer surface the second plate structure and a third outer surface of the contact structure; and a pressing structure engaged with the shaft structure and pressing an other (Continued)

of the second outer surface of the second plate structure and the third outer surface of the contact structure.

20 Claims, 4 Drawing Sheets

(56) References Cited

U.S. PATENT DOCUMENTS

| | | | | |
|---|---|---|---|---|
| 5,746,558 | A | * | 5/1998 | Nygren, Jr. ............ F16B 5/025 411/110 |
| 5,746,561 | A | * | 5/1998 | Nygren, Jr. ........... F16B 5/0225 411/113 |
| 5,888,012 | A | * | 3/1999 | Nygren, Jr. ........... F16B 5/0225 411/113 |
| 8,910,449 | B2 | * | 12/2014 | Burke ................... E04B 1/4121 411/533 |
| 9,068,347 | B2 | * | 6/2015 | Moeller ................ E04B 1/4157 |
| 9,121,436 | B2 | | 9/2015 | Hahner |
| 11,312,482 | B2 | * | 4/2022 | Bacon .................... B64C 1/1461 |
| 11,352,119 | B2 | * | 6/2022 | Guering .................. B64C 1/069 |
| 2008/0273938 | A1 | | 11/2008 | Rowe et al. |
| 2013/0287519 | A1 | | 10/2013 | Weiss |
| 2014/0020321 | A1 | * | 1/2014 | Eklund ..................... E04B 1/61 52/582.1 |
| 2018/0057142 | A1 | | 3/2018 | Wilkerson |
| 2020/0172221 | A1 | * | 6/2020 | Guering .................. B64C 1/069 |

FOREIGN PATENT DOCUMENTS

| | | | | |
|---|---|---|---|---|
| GB | 2312265 | A | * 10/1997 | .......... E04F 13/0805 |
| JP | 61-502410 | A | 10/1986 | |
| JP | 2002-242922 | A | 8/2002 | |
| JP | 5267796 | B2 | 8/2013 | |
| JP | 2014-500444 | A | 1/2014 | |
| WO | 86/00118 | A1 | 1/1986 | |

* cited by examiner

AIRCRAFT COMPONENT COUPLING ASSEMBLY AND COUPLER FOR AIRCRAFT COMPONENTS

CROSS-REFERENCE TO RELATED APPLICATIONS

The present application claims priority to PCT/JP2020/019951 filed May 20, 2020, and JP 2019-096716 filed May 23, 2019, both of which are incorporated herein by reference.

TECHNICAL FIELD

The present disclosure relates to an aircraft component coupling assembly and a coupler for aircraft components.

BACKGROUND

In production of an aircraft fuselage, a frame disposed on the inner circumferential surface of the fuselage and extending in the circumferential direction to support the skin of the fuselage may be coupled by a coupler to a floor beam dividing the internal space of the fuselage into two upper and lower compartments. In this case, for example, through holes are formed beforehand in those portions of the frame and beam at which the frame and beam are to be coupled, then the respective through holes of the frame and beam are aligned with each other, and finally the coupler is inserted into the through holes to couple the frame and beam together.

In general, the alignment between the through holes needs to be accomplished with high precision to ensure a high coupling stability. However, such high precision of the alignment is difficult to achieve in the case where the through holes are formed beforehand. In contrast, for example, in the case of placing the frame and beam on each other and then forming the through holes in the frame and beam, the through holes can be aligned precisely.

SUMMARY

An aircraft component coupling assembly according to an aspect of the present disclosure includes: a first plate structure, a second plate structure, and a coupler coupling the first plate structure and the second plate structure. The first plate structure includes a first insertion hole and a first serration located on a first outer surface of the first plate structure and surrounding the first insertion hole, the outer surface facing away from the second plate structure. The second plate structure includes a second insertion hole differing in inner diameter from the first insertion hole. The coupler includes: a contact structure including a second serration and a third insertion hole, the second serration contacting the first outer surface of the first plate structure and meshing with the first serration of the first plate structure; a shaft structure inserted into the first, second, and third insertion holes, the shaft structure including a fixed engagement portion fixedly engaged with one of a second outer surface the second plate structure and a third outer surface of the contact structure; and a pressing structure engaged with the shaft structure and pressing an other of the second outer surface of the second plate structure and the third outer surface of the contact structure.

DETAILED DESCRIPTION OF THE DRAWINGS

The inventors have recognized that conventional technologies involve a boring process performed inside the aircraft fuselage, and this process requires a lot of time and effort. Additionally, for example, in the case of disposing eccentric bushings in the respective through holes of the frame and beam and coupling the frame and beam with the aid of the eccentric bushings, the number of components in the coupling assembly is increased because of the eccentric bushings and components for preventing rotation of the bushings, and this could lead to an increased production cost. Such a problem may arise also when aircraft components are coupled together in production of an aircraft.

Therefore, the inventors developed the technologies of the present application, which provide a coupling method and a coupler for coupling aircraft components, the method and coupler being adapted to reduce the time and effort required for the coupling process and to be implemented at a low cost.

Hereinafter, exemplary embodiments will be described with reference to the drawings. In the following description, the front-rear direction and left-right direction of an aircraft will be simply referred to as "front-rear direction" and "left-right direction", respectively.

FIRST EMBODIMENT

Figure 1:
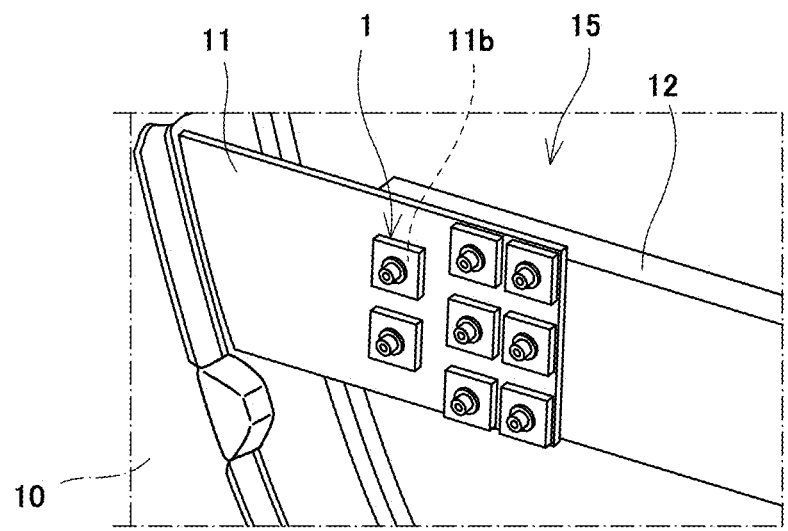
FIG. 1 is a perspective view showing an aircraft fuselage according to an exemplary embodiment, in particular a part where a beam and frame are coupled.
Figure 2:
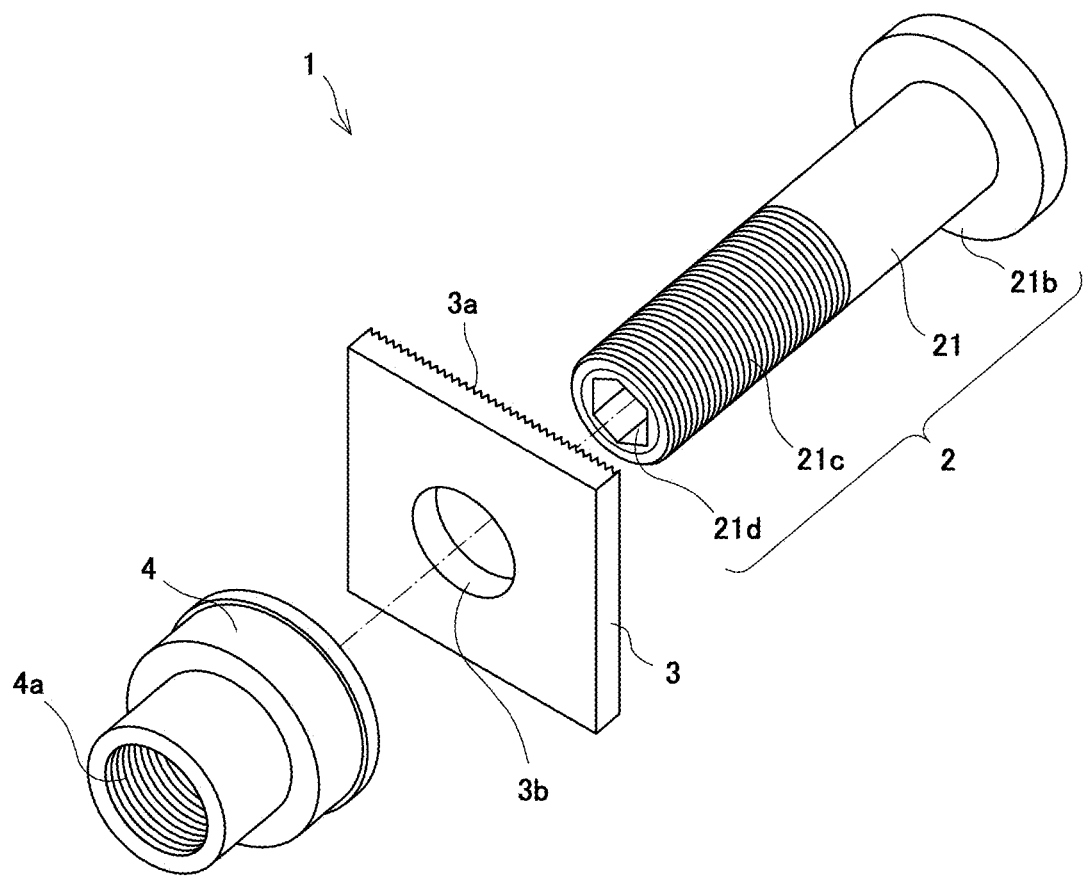
FIG. 2 is an exploded view of a coupler shown in FIG. 1.
Figure 3:
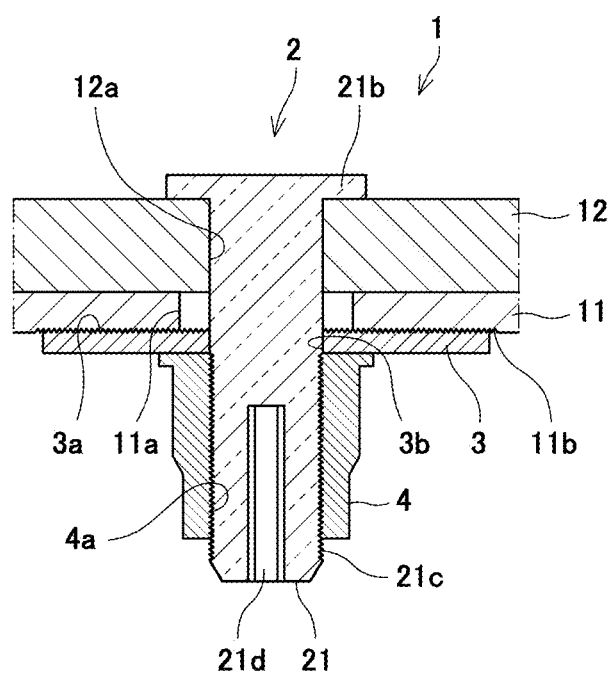
FIG. 3 is a cross-sectional view showing the coupler of FIG. 2 together with the frame and beam which are coupled by the coupler.
Figure 4:
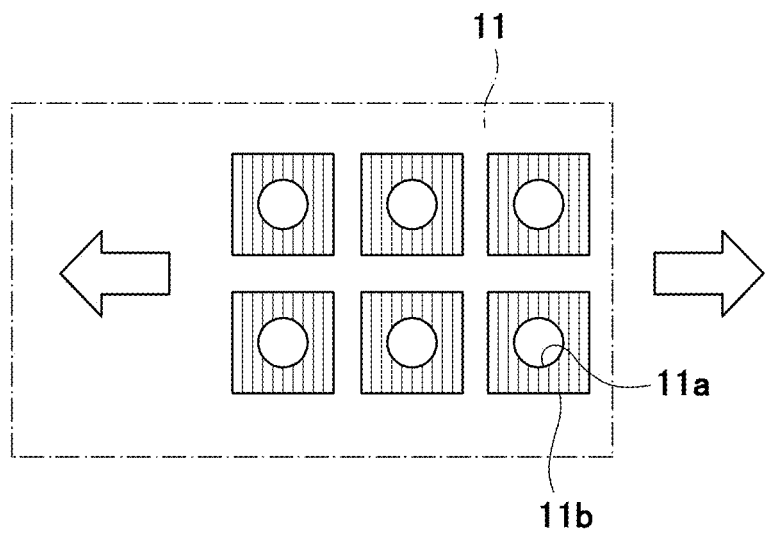
FIG. 4 is a partial front view of the frame shown in FIG. 1.

FIG. 1 is a cross-sectional view of an aircraft fuselage 10 according to an exemplary embodiment. FIG. 2 is an exploded view of a coupler 1 shown in FIG. 1. FIG. 3 is a cross-sectional view showing the coupler 1 of FIG. 2 together with a frame 11 and beam 12 which are coupled by the coupler 1. FIG. 4 is a partial front view of the frame 11 shown in FIG. 1.

The aircraft fuselage 10 shown in FIG. 1 includes an aircraft component coupling assembly 15. The coupling assembly 15 includes at least one coupler 1 (couplers 1 in this embodiment), a frame 11 (first plate structure), and a beam 12 (second plate structure). The frame 11 and beam 12 are an example of a pair of aircraft components placed on each other and coupled by the coupler 1.

The frame 11 is a part of the framework of the aircraft fuselage 10. The frame 11 is disposed on the inner circumferential surface of the aircraft fuselage 10 and extends in the circumferential direction to support the skin of the aircraft fuselage 10. The frame 11 may be made of metallic or non-metallic material. The frame 11 includes a metallic structure to be joined to the beam 12, the structure being located between the top and bottom of the inner circumferential surface of the aircraft fuselage 10 and extending in the left-right direction from the inner circumferential surface of the aircraft fuselage 10. This structure may be integral with the frame 11 or may be separate from and coupled to the frame 11. Hereinafter, this structure will be simply referred to as "frame 11" for convenience of illustration.

The beam 12 is a floor beam that divides the internal space of the aircraft fuselage 10 into two upper and lower compartments and from which loads are transmitted to the frame 11. The beam 12 is located inside the aircraft fuselage 10 and extends in the left-right direction. The direction of the normal to the major surface of the beam 12 coincides with the front-rear direction. A longitudinal end of the beam 12 is placed on a part of the frame 11 and coupled to the frame 11. The beam 12 is made of, for example, a composite material containing carbon.

As shown in FIGS. 3 and 4, the frame 11 includes a first insertion hole 11a extending through the thickness of the frame 11 and at least one first serration 11b located on an outer surface of the frame 11 and surrounding the first insertion hole 11a, the outer surface facing away from the beam 12. The first serration 11b is brought into mesh with a second serration 3a of a contact structure 3 described later. In this embodiment, the first serrations 11b are located at discrete locations on the outer surface of the frame 11.

The contour of the first insertion hole 11a is circular in this example, but not limited to being circular. In a plan view of the frame 11, the first serration 11b has, for example, a serrated pattern including peaks and valleys extending in a first direction (e.g., the up-down direction) and alternating in a second direction perpendicular to the first direction (e.g., the left-right direction). All the peaks have the same features, and all the valleys have the same features. In this embodiment, the peaks and valleys of each first serration 11b extend straight in the first direction. The first direction is the same for all the first serrations 11b of the frame 11, and the second direction is also the same for all the first serrations 11b.

The serrated pattern of the first serration 11b may include peaks of different shapes or valleys of different shapes. The serrated patterns of the first serrations 11b may be different from one another.

The beam 12 includes second insertion holes 12a extending through the thickness of the beam 12 and having a smaller inner diameter than the first insertion holes 11a. The frame 11 and beam 12 are coupled by the couplers 1 located at discrete locations in a plane perpendicular to the front-rear direction and inserted into the first and second insertion holes 11a and 12a. The facing surfaces of the frame 11 and beam 12 are flat.

In the aircraft fuselage 10, a cabin is located above the beam 12. The beam 12 is beneath a floor assembly defining the bottom of the cabin and supports the floor assembly from below. The beam 12 receives loads transmitted from the floor assembly. Since the beam 12 is coupled to the frame 11 by the couplers 1, the loads are transmitted from the beam 12 to the frame 11. Thus, the loads applied to the floor assembly are borne by the aircraft fuselage 10.

The following describes the detailed configurations of the coupler 1, frame 11, and beam 12. As shown in FIGS. 2 to 4, the coupler 1 includes a shaft structure 2, a contact structure 3, and a pressing structure 4. The shaft structure 2 has an outer diameter equal to the inner diameters of the second insertion hole 12a and a third insertion hole 3b of the contact structure 3, and is inserted into the first, second, and third insertion holes 11a, 12a, and 3b. The shaft structure 2 includes a fixed engagement portion 21b fixedly engageable with the outer surface of one of the beam 12 and contact structure 3. As used herein, the statement that diameters are equal encompasses the case where the diameters differ by a slight amount within tolerance.

More specifically, the shaft structure 2 includes a shaft portion 21. The shaft portion 21 includes the fixed engagement portion 21b and is inserted into the first, second, and third insertion holes 11a, 12a, and 3b. The outline of the radial cross-section of the shaft portion 21 has, for example, the same shape as the contours of the first and second insertion holes 11a and 12a. The fixed engagement portion 21b is located at one axial end of the shaft portion 21. In this embodiment, the fixed engagement portion 21b is located at the end (the beam 12—side end) opposite that part of the shaft portion 21 of the shaft structure 2 which is inserted into and through the first, second, and third insertion holes 11a, 12a, and 3b (this part will be simply referred to as "distal insertion part" hereinafter).

The contact structure 3 includes a second serration 3a that contacts the outer surface of the frame 11 to mesh with the first serration 11b of the frame 11. The contact structure 3 is combined with the shaft portion 21. The contact structure 3 is located radially outward of the shaft portion 21 and contacts the outer surface of the frame 11.

The third insertion hole 3b of the contact structure 3 extends through the thickness of the contact structure 3. The contour of the third insertion hole 3b has the same shape as the outline of the radial cross-section of the shaft portion 21. The shaft portion 21 is inserted into the third insertion hole 3b. The inner diameter of the third insertion hole 3b is smaller than the inner diameter of the first insertion hole 11a. The inner diameter of the third insertion hole 3b is equal to the outer diameter of that part of the shaft portion 21 which is surrounded by the inner circumferential surface of the third insertion hole 3b. Thus, the radial clearance between the third insertion hole 3b and the shaft portion 21 inserted into the third insertion hole 3b is reduced.

In this embodiment, the second serration 3a is placed to mesh with the first serration 11b in a direction from the distal insertion part to the opposite end. In other words, the contact structure 3 is placed with the second serration 3a facing away from the distal insertion part of the shaft portion 21.

The pressing structure 4 engages with the shaft structure 2 to press the other of the outer surface of the beam 12 and contact structure 3. In this embodiment, the pressing structure 4 presses the outer surface of the contact structure 3. The pressing structure 4 is attached to the distal insertion part of the shaft portion 21. In this embodiment, the pressing structure 4 presses the contact structure 3 against the outer surface of the frame 11 at a location between the pressing structure 4 and the fixed engagement portion 21b, thus pressing the frame 11 against the beam 12 via the contact structure 3.

The inner diameter of the first insertion hole 11a of the frame 11 is larger than the inner diameter of the second insertion hole 12a of the beam 12. This makes it easy to place the frame 11 and beam 12 on each other in such a manner that the second insertion hole 12a is inside the first insertion hole 11a when the frame 11 and beam 12 are viewed in their thickness direction. As such, the first and second insertion holes 11a and 12a can easily be aligned with each other, and the shaft portion 21 can easily be inserted into the first and second insertion holes 11a and 12a.

The inner diameter of the second insertion hole 12a of the beam 12 is smaller than the inner diameter of the first insertion hole 11a of the frame 11 and, in this example, is equal to the inner diameter of the third insertion hole 3b. Thus, the radial clearance between the second insertion hole 12a and the shaft portion 21 inserted into the second insertion hole 12a is reduced.

As described above, the adjustment of the relative position between the frame 11 and beam 12 can be performed somewhat roughly. In contrast, the adjustment of the relative position between the shaft portion 21 and contact structure 3 in the radial direction of the third insertion hole 3*b* and the adjustment of the relative position between the shaft portion 21 and beam 12 in the radial direction of the second insertion hole 12*a* are accomplished precisely. The outer diameter of that part of the shaft portion 21 which is surrounded by the inner circumferential surface of the second insertion hole 12*a* may be equal to or different from the outer diameter of that part of the shaft portion 21 which is surrounded by the inner circumferential surface of the third insertion hole 3*b*.

As shown in FIGS. 2 and 3, the shaft portion 21 includes an external thread 21*c* on its circumferential surface. The external thread 21*c* is located in a part of the shaft portion 21, in particular in a region extending from the distal end of the distal insertion part of the shaft portion 21 to a point located between the distal end of the distal insertion part and the opposite end of the shaft portion 21 in the axial direction of the shaft portion 21. However, the external thread 21*c* is not limited to this location. The distal end of the distal insertion part of the shaft portion 21 includes an insertion hole 21*d* into which a hexagonal wrench is insertable. The pressing structure 4 is, for example, a nut including an internal thread 4*a* engageable with the external thread 21*c*. That is, in this embodiment, the coupler 1 is a fastener including the external and internal threads 21*c* and 4*a*. In the coupler 1, the external and internal threads 21*c* and 4*a* are engaged to press the second serration 3*a* against the first serration 11*b*.

In this embodiment, the shaft structure 2 includes a bolt. The bolt includes a head. The shaft portion 21 is the shaft of the bolt, and the fixed engagement portion 21*b* is the head of the bolt. The contact structure 3 is a plate fitted around the shaft portion 21. The shaft structure 2 and contact structure 3 may be integral with each other. The shaft structure 2 may be devoid of the bolt. In this case, the pressing structure 4 may be engaged with the shaft portion 21 of the shaft structure 2 by means other than thread engagement.

The following describes the method of constructing the coupling assembly 15 in which the frame 11 and beam 12 are coupled by the coupler 1. First, the operator prepares the frame 11 including the first insertion hole 11*a* and the beam 12 including the second insertion hole 12*a* in the aircraft fuselage 10. The operator places the frame 11 and beam 12 on each other in the front-rear direction and adjusts the relative position between the frame 11 and beam 12 to align the first and second insertion holes 11*a* and 12*a*. The operator need not adjust the relative position between the frame 11 and beam 12 so precisely, because the inner diameter of the first insertion holes 11*a* is different from the inner diameter of the second insertion holes 12*a*. This reduces the time required for the adjustment of the relative position between the frame 11 and beam 12.

In this embodiment, the inner diameter of the first insertion hole 11*a* is larger than the inner diameter of the second insertion hole 12*a*. However, the inner diameter of the first insertion hole 11*a* may, for example, be smaller than the inner diameter of the second insertion hole 12*b* from the viewpoint of reducing the time required for the adjustment of the relative position between the frame 11 and beam 12.

Next, the operator inserts the shaft portion 21 of the shaft structure 2 into the second insertion hole 12*a* and then into the first insertion hole 11*a*, thus fixedly engaging the fixed engagement portion 21*b* of the shaft structure 2 with the outer surface of the beam 12. After that, the contact structure 3 is fitted around the shaft portion 21 of the shaft structure 2 in the direction from the distal end to the opposite end of the distal insertion part of the shaft portion 21 (on the frame 11 side in the front-rear direction) to bring the second serration 3*a* of the contact structure 3 into mesh with the first serration 11*b* of the frame 11. In this state, the operator attaches the pressing structure 4 around the shaft portion 21. In this embodiment, where the shaft portion 21 is a shaft of a bolt and the pressing structure 4 is a nut, the internal thread 4*a* of the pressing structure 4 is brought into engagement with the external thread 21*c* of the shaft portion 21.

In this embodiment, where the distal end of the distal insertion part of the shaft portion 21 includes the insertion hole 21*d* for a hexagonal wrench, the hexagonal wrench is inserted into the insertion hole 21*d*, and the inserted wrench is used to engage the internal thread 4*a* of the pressing structure with the external thread 21*c* of the shaft portion 21 on the frame 11 side in the front-rear direction. This thread engagement using the wrench can be efficiently accomplished with the axis of the shaft portion 21 fixed in place. The operator brings the external and internal threads 21*c* and 4*a* into engagement at all the coupling points in the manner as described above. Consequently, the frame 11 and beam 12 are coupled by the couplers 1 at all the coupling points.

As described above, the frame 11 which includes the first insertion holes 11*a* extending through the thickness of the frame 11 and the first serrations 11*b* located on an outer surface of the frame 11 and surrounding the first insertion holes 11*a*, and the beam 12 which includes the second insertion holes 12*a* extending through the thickness of the beam 12 and having a smaller inner diameter than the first insertion holes 11*a*, are placed on each other with the first serrations 11*b* facing outward, and the frame 11 and beam 12 thus placed are coupled by the couplers 1. In this manner, the coupling assembly 15 with the frame 11 and beam 12 coupled together is constructed.

In this embodiment, as shown in FIG. 4, the peaks and valleys of each first serration 11*b* extend in the up-down direction. Thus, with the first and second serrations 11*b* and 3*a* in mesh, loads are reliably transmitted from the beam 12 to the frame 11 in the left-right direction. Additionally, the meshing of the first and second serrations 11*b* and 3*a* allows the frame 11 and contact structure 3 to be in contact over a large area, leading to increased friction resistance in the plane of contact between the frame 11 and contact structure 3. This results in proper load transmission not only in the left-right direction but also in other directions.

In this embodiment, as described above, the frame 11 and beam 12 are placed on each other, and the shaft structure 2 is inserted into the first and insertion holes 11*a* and 12*a*. Further, the outer surface of the contact structure 3 is pressed by the pressing structure 4 at a location between the pressing structure 4 and the fixed engagement portion 21*b*, and the second serration 3*a* of the contact structure 3 pressed by the pressing structure 4 is brought into mesh with the first serration 11*b* of the frame 11.

Since the inner diameters of the first and second insertion holes 11*a* and 12*a* are different, the shaft structure 2 can be quickly inserted into the first and second insertion holes 11*a* and 12*a* even in the case where the first and second insertion holes 11*a* and 12*a* are not aligned so precisely. Additionally, since the first and insertion holes 11*a* and 12*a* can be formed beforehand in the frame 11 and beam 12, the frame 11 and beam 12 need not be subjected to boring when they are coupled together. This can reduce the time (flow time) and effort required for the coupling process.

Additionally, since the coupler 1 can be constructed of the shaft structure 2, contact structure 3, and pressing structure 4, the configuration of the coupler 1 can be simplified. This can reduce the cost spent on the coupler 1.

Additionally, since the second serration 3a is brought into mesh with the first serration 11b, the relative position between the shaft structure 2 and frame 11 can be adjusted precisely with respect to the axis of the shaft structure 2, and the shaft structure 2 and frame 11 can be in surface contact over a large area.

Additionally, the shaft structure 2 has an outer diameter equal to the inner diameters of the second insertion hole 12a of the beam 12 and the third insertion hole 3b of the contact structure 3. Further, the inner diameters of the second insertion hole 12a of the beam 12 and the third insertion hole 3b of the contact structure 3 are smaller than the inner diameter of the first insertion hole 11a of the frame 11. Thus, loads from the beam 12 can be reliably transmitted to the shaft structure 2, contact structure 3, and frame 11. The use of the coupler 1 permits proper load transmission from one to the other of the frame 11 and beam 12, leading to the coupling assembly 15 having a high coupling strength.

Generally, in the case where first and second plate structures are coupled with the aid of serrations, at least the respective portions of the first and second plate structures where the serrations are located need to be made of metallic material. In contrast, in this embodiment, the beam 12 (second plate structure) need not include any serration. This eliminates the need to use any metal as the material of the beam 12, thus enlarging the range of choices for the material of the beam 12 and increasing the design flexibility of the beam 12.

In the case where a plate structure made of composite material is coupled to another plate structure using an eccentric bushing, the insertion of the eccentric bushing into an insertion hole of the composite material plate structure could cause wearing down of the composite material due to rotation of the eccentric bushing. A possible approach to this problem is to attach a rotation stopper to the insertion hole; however, it is often difficult to equip a plate structure made of composite material with a rotation stopper because of the properties of the plate structure. Additionally, some plate structures made of composite material and provided with insertion holes have relatively low strength around the insertion holes. In such cases, the regions around the insertion holes need to be reinforced considerably. For the above reasons, the portion of a composite material plate structure that is coupled to another plate structure needs to be equipped with, for example, a link made of metallic material. This could lead to complicated configuration and increased cost of the coupling assembly.

In contrast, in this embodiment, the use of the coupler 1 allows the beam 12 made of composite material to be efficiently coupled to the frame 11 without the need for any eccentric bushings. Thus, the coupling assembly 15 with the frame 11 and beam 12 coupled together can be constructed in a simple configuration and at a low cost.

Additionally, the fixed engagement portion 21b is located at the end of the shaft structure 2 opposite the distal insertion part of the shaft structure 2, and the second serration 3a is placed to mesh with the first serration 11b in the direction from the distal insertion part to the opposite end of the shaft structure 2. Thus, the second serration 3a can easily be pressed against the first serration 11b by the pressing structure 4, and this allows the first and second serrations 11b and 3a to securely mesh with each other.

Additionally, the shaft structure 2 includes the shaft portion 21 including the external thread 21c on the circumferential surface of the shaft portion 21, and the pressing structure 4 is a nut including the internal thread 4a engageable with the external thread 21c. The external and internal threads 21c and 4a are engaged to press the second serration 3a against the first serration 11b.

Thus, the configuration of the pressing structure 4 can be relatively simple, and the pressing force applied by the pressing structure 4 in the axial direction of the shaft structure 2 can easily be adjusted by varying the degree of thread engagement between the external and internal threads 21c and 4a.

The shaft structure 2 includes a bolt including a head, the shaft portion 21 is the shaft of the bolt, the fixed engagement portion 21b is the head of the bolt, and the contact structure 3 is a plate fitted around the shaft portion 21. Thus, the configuration of the coupler 1 can be relatively simple, and the coupler 1 can be constructed quickly at a low cost by combining an existing bolt and plate.

The facing surfaces of the frame 11 and beam 12 are flat. Thus, the relative position between the frame 11 and beam 12 need not be adjusted so precisely, unlike the case where, for example, the facing surfaces of the frame 11 and beam 12 are provided with serrations. As such, sufficient adjustment of the relative position between the frame 11 and beam 12 can be accomplished quickly. Hereinafter, other embodiments will be described with emphasis on differences from the first embodiment.

SECOND EMBODIMENT

Figure 5:
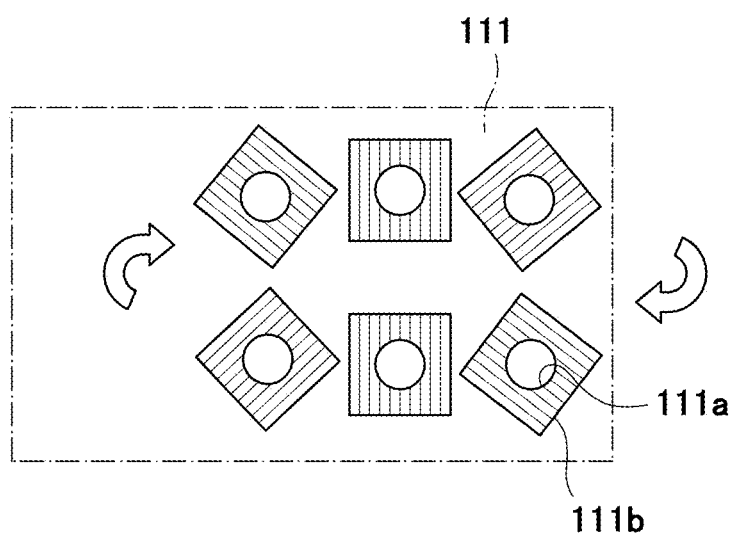
FIG. 5 is a partial front view of a frame according to a second embodiment.

FIG. 5 is a partial front view of a frame 111 according to a second embodiment. As shown in FIG. 5, the frame 111 includes first insertion holes 111a and first serrations 111b. In a plan view of the frame 111, the first serrations 111b surround the first insertion holes 111a. In each first serration 111b, the peaks and valleys extend radially as a whole with respect to the center in the left-right and up-down directions of the region enclosed by the first serrations 111b.

The above configuration is advantageous in that over the region where the first serrations 111b and the second serrations 3a are in mesh, loads imposed on the beam 12 can be more reliably borne by the frame 111 in diverse directions extending radially from the above center along the major surface of the frame 111.

THIRD EMBODIMENT

Figure 6:
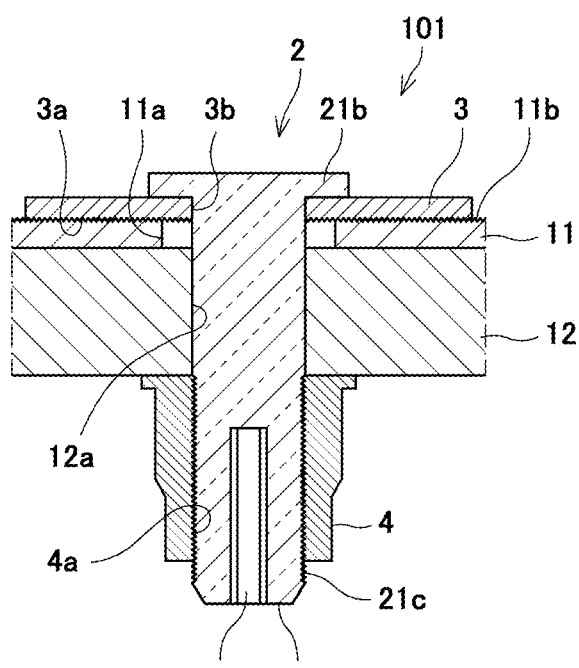
FIG. 6 is a cross-sectional view showing a coupler according to a third embodiment together with a frame and beam which are coupled by the coupler.

FIG. 6 is a cross-sectional view showing a coupler 101 according to a third embodiment together with the frame 11 and beam 12 which are coupled by the coupler 101. The coupler 101 includes the shaft structure 2 and pressing structure 4 identical to those of the coupler 1. In the coupler 101, the contact structure 3 is placed with the second serration 3a facing toward the distal insertion part of the shaft portion 21. The shaft portion 21 of the shaft structure 2 is inserted into the first insertion hole 11a and then into the second insertion hole 12a. Thus, the second serration 3a of the contact structure 3 is pressed against the first serration 11b toward the pressing structure 4. Such a coupling assembly provides the same benefits as the coupling assemblies of the embodiments previously described.

FOURTH EMBODIMENT

Figure 7:
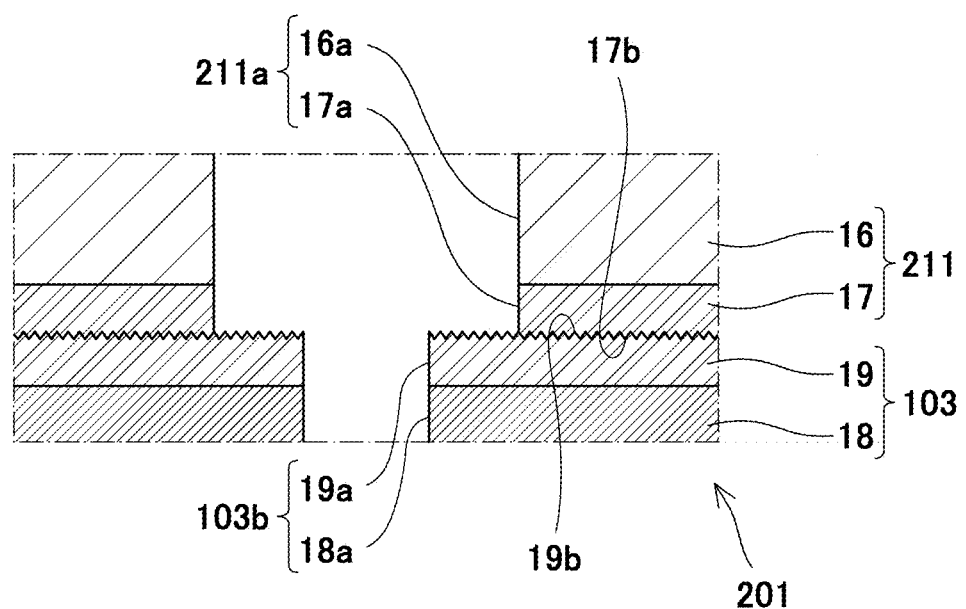
FIG. 7 is a partial cross-sectional view showing a coupler and frame according to a fourth embodiment.

FIG. 7 is a partial cross-sectional view showing a coupler 201 and frame 211 according to a fourth embodiment. As shown in FIG. 7, the coupler 201 includes a contact structure 103, and the contact structure 103 includes a contact plate 18 and a serrated element 19. The contact plate 18 includes a through hole 18a extending through the thickness of the contact plate 18. The serrated element 19 is placed on and secured to the contact plate 18. The serrated element 19 is plate-shaped and includes a through hole 19a extending through the thickness of the serrated element 19 and a second serration 19b. In the present embodiment, the through hole 18a of the contact plate 18 and the through hole 19a of the serrated element 19 form a third insertion hole 103b.

As shown in FIG. 7, the frame 211 includes a base plate 16 and a serrated element 17. The base plate 16 includes a through hole 16a extending through the thickness of the base plate 16. The serrated element 17 is placed on and secured to the base plate 16. The serrated element 17 is plate-shaped and includes a through hole 17a extending through the thickness of the serrated element 17 and a first serration 17b. In the present embodiment, the through hole 16a of the base plate 16 and the through hole 17a of the serrated element 17 are aligned to form a first insertion hole 211a.

In the above configuration, the contact structure 103 can be constructed of the contact plate 18 and serrated element 19. Thus, for example, the contact structure 103 can easily be modified in various ways by using the same contact plate 18 with different serrated elements 19.

Additionally, in the above configuration, the frame 211 can be constructed of the base plate 16 and the serrated element 17. Thus, for example, the frame 211 can easily be adapted to different couplers by using the same base plate 16 with different serrated elements 17.

The securing of the serrated element 19 to the contact plate 18 and the securing of the serrated element 17 to the base plate 16 are accomplished, for example, by adhesive bonding. The securing technique is not limited to adhesive bonding, and the securing of the serrated elements 17 and 19 may be accomplished, for example, by using fasteners. The coupler 201 may be combined with the frame 11 or 111, and the frame 211 may be combined with the coupler 1 or coupler 101.

The present disclosure is not limited to the embodiments described above, and changes, additions, or deletions can be made to the configurations of the above embodiments without departing from the gist of the present disclosure. The first plate structure coupled in the aircraft component coupling assembly of the present disclosure is not limited to the frames 11 and 111, and the second plate structure coupled in the coupling assembly is not limited to the beam 12. The first and second plate structures may be other plate structures disposed in an aircraft.

The invention claimed is:

1. A coupling assembly, comprising:
a first plate structure;
a second plate structure; and
a coupler coupling the first plate structure and the second plate structure, wherein
the first plate structure includes a first insertion hole and a first serration located on a first outer surface of the first plate structure and surrounding the first insertion hole, the first outer surface facing away from the second plate structure,
the second plate structure includes a second insertion hole in having an inner diameter smaller than an inner diameter of the first insertion hole, and
the coupler includes:
a contact structure including a second serration and a third insertion hole, the second serration contacting the first outer surface of the first plate structure and meshing with the first serration of the first plate structure,
a shaft structure which contacts an inner circumferential surface of the second insertion hole and an inner circumferential surface of the third insertion hole and does not contact an inner circumferential surface of the first insertion hole when inserted through the first, second and third insertion holes, the shaft structure including a fixed engagement portion fixedly engaged with one of a second outer surface of the second plate structure and a third outer surface of the contact structure, and
a pressing structure engaged with the shaft structure and pressing an other of the second outer surface of the second plate structure and the third outer surface of the contact structure.

2. The coupling assembly according to claim 1, wherein
the shaft structure has an outer diameter equal to inner diameters of the second insertion hole of the second plate structure and the third insertion hole of the contact structure, and
the inner diameters of the second and third insertion holes are smaller than the inner diameter of the first insertion hole.

3. The coupling assembly according to claim 1, wherein
the fixed engagement portion is located at an end of the shaft structure opposite a distal insertion part of the shaft structure, the distal insertion part being inserted into and through the first, second, and third insertion holes, and
the second serration is placed to mesh with the first serration in a direction from the distal insertion part to the opposite end of the shaft structure.

4. The coupling assembly according to claim 1, wherein
the shaft structure includes a shaft portion including an external thread on a circumferential surface of the shaft portion,
the pressing structure is a nut including an internal thread engageable with the external thread, and
the external thread and internal thread are engaged to press the second serration against the first serration.

5. The coupling assembly according to claim 4, wherein
the shaft structure includes a bolt including a head,
the shaft portion is a shaft of the bolt,
the fixed engagement portion is the head of the bolt, and
the contact structure is a plate fitted around the shaft of the bolt.

6. The coupling assembly according to claim 1, wherein facing surfaces of the first and second plate structures are flat.

7. The coupling assembly according to claim 1, wherein the contact structure includes the third insertion hole, a contact plate, and a coupler serrated element placed on and secured to the contact plate, the coupler serrated element including the second serration.

8. The coupling assembly according to claim 1, wherein the first plate structure includes the first insertion hole, a base plate, and a plate serrated element placed on and secured to the base plate, the plate serrated element including the first serration.

9. A coupler for aircraft components that couples a first plate structure and a second plate structure, the first plate structure including a first insertion hole and a first serration located on a first outer surface of the first plate structure and surrounding the first insertion hole, the second plate structure including a second insertion hole having an inner diameter smaller than an inner diameter of the first insertion hole, the coupler comprising:
- a contact structure including a second serration and a third insertion hole, the second serration being contacted with the first outer surface of the first plate structure to mesh with the first serration of the first plate structure;
- a shaft structure which contacts an inner circumferential surface of the second insertion hole and an inner circumferential surface of the third insertion hole and does not contact an inner circumferential surface of the first insertion hole when inserted through the first, second and third insertion holes, the shaft structure including a fixed engagement portion that is fixedly engaged with one of a second outer surface of the second plate structure and a third outer surface of the contact structure; and
- a pressing structure that is engaged with the shaft structure to press an other of the second outer surface of the second plate structure and the third outer surface of the contact structure.

10. The coupler according to claim 9, wherein the shaft structure has an outer diameter equal to inner diameters of the second insertion hole of the second plate structure and the third insertion hole of the contact structure.

11. The coupler according to claim 10, wherein the inner diameters of the second and third insertion holes are smaller than the inner diameter of the first insertion hole.

12. The coupler according to claim 9, wherein the contact structure includes the third insertion hole, a contact plate, and a coupler serrated element placed on and secured to the contact plate, the coupler serrated element including the second serration.

13. A coupling assembly, comprising:
- a frame including a first insertion hole and a first serration, the first insertion hole having a first diameter, and the first serration being located on a first outer surface of the frame and surrounding the first insertion hole;
- a beam including a second insertion hole having a second diameter smaller than the first diameter; and
- a coupler that couples the frame to the beam, the coupler including:
  - a contact plate including a second serration and a third insertion hole, the second serration contacting the first outer surface of the frame and meshing with the first serration of the frame,
  - a shaft which contacts an inner circumferential surface of the second insertion hole and an inner circumferential surface of the third insertion hole and does not contact an inner circumferential surface of the first insertion hole when inserted through the first insertion hole, the second insertion hole and the third insertion hole, the shaft including a fixed engagement portion fixedly engaged with one of a second outer surface of the beam and a third outer surface of the contact plate, and
  - a pressing nut engaged with the shaft and pressing an other of the second outer surface of the beam and the third outer surface of the contact plate, wherein
  the first outer surface of the frame faces away from the beam.

14. The coupling assembly according to claim 13, wherein
- the shaft has an outer diameter equal to inner diameters of the second insertion hole of the beam and the third insertion hole of the contact plate, and
- the inner diameters of the second and third insertion holes are smaller than the first diameter of the first insertion hole.

15. The coupling assembly according to claim 13, wherein
- the fixed engagement portion is located at an end of the shaft opposite a distal insertion part of the shaft, the distal insertion part being inserted into and through the first, second, and third insertion holes, and
- the second serration is placed to mesh with the first serration in a direction from the distal insertion part to the opposite end of the shaft.

16. The coupling assembly according to claim 13, wherein
- the shaft includes a shaft portion including an external thread on a circumferential surface of the shaft portion,
- the pressing nut includes an internal thread engageable with the external thread, and
- the external thread and internal thread are engaged to press the second serration against the first serration.

17. The coupling assembly according to claim 16, wherein
- the shaft includes a bolt including a head,
- the shaft portion is a shaft of the bolt,
- the fixed engagement portion is the head of the bolt, and
- the contact plate is fitted around the shaft of the bolt.

18. The coupling assembly according to claim 13, wherein facing surfaces of the frame and the beam are flat.

19. The coupling assembly according to claim 13, wherein the contact plate includes a coupler serrated element placed on and secured to a surface of the contact plate, the coupler serrated element including the second serration.

20. The coupling assembly according to claim 13, wherein the frame includes a base plate, and a plate serrated element placed on and secured to the base plate, the plate serrated element including the first serration.

* * * * *